(12) United States Patent
Bowling et al.

(10) Patent No.: US 11,639,258 B2
(45) Date of Patent: May 2, 2023

(54) SUSTAINABLE SEALED PACKAGE AND METHOD FOR MANUFACTURING THEREOF

(71) Applicant: WestRock MWV, LLC, Atlanta, GA (US)

(72) Inventors: Allison Bowling, Atlanta, GA (US); Wayne Cameron, Midlothian, VA (US); Jerry Hawkins, Winston-Salem, NC (US)

(73) Assignee: WestRock MWV, LLC, Atlanta, GA (US)

( * ) Notice: Subject to any disclaimer, the term of this patent is extended or adjusted under 35 U.S.C. 154(b) by 0 days.

(21) Appl. No.: 17/830,415

(22) Filed: Jun. 2, 2022

(65) Prior Publication Data

US 2022/0288903 A1 Sep. 15, 2022

Related U.S. Application Data

(63) Continuation of application No. PCT/US2021/037476, filed on Jun. 15, 2021.
(Continued)

(51) Int. Cl.
*B65D 53/06* (2006.01)
*B32B 1/02* (2006.01)
(Continued)

(52) U.S. Cl.
CPC ............ *B65D 53/06* (2013.01); *B32B 27/065* (2013.01); *B32B 27/10* (2013.01); *B32B 27/306* (2013.01);
(Continued)

(58) Field of Classification Search
CPC ......... B32B 1/02; B32B 27/065; B32B 27/10; B32B 27/30; B32B 27/306; B32B 27/32; B32B 27/327; B32B 27/36; B32B 29/002; B32B 29/007; B32B 37/04; B32B 2266/02; B32B 2305/022; B32B 2307/31;
(Continued)

(56) References Cited

U.S. PATENT DOCUMENTS

| 4,498,588 A * | 2/1985 | Scott ...................... B65D 75/32 426/106 |
| 7,192,640 B2 * | 3/2007 | Holbert ................... B32B 27/08 428/476.3 |

(Continued)

FOREIGN PATENT DOCUMENTS

| KR | 101 061 045 B1 | 9/2011 |
| WO | 99/065977 | 12/1999 |
| WO | 02/072335 | 9/2002 |

OTHER PUBLICATIONS

International Search Report, PCT/US2021/037476.
Written Opinion of the International Searching Authority, PCT/US2021/037476.

*Primary Examiner* — Walter Aughenbaugh
(74) *Attorney, Agent, or Firm* — Walters & Wasylyna LLC

(57) ABSTRACT

A sustainable sealed package includes a biofoam molded tray and a paperboard substrate. The biofoam molded tray includes a circumferential flange defining an opening to an interior cavity of the biofoam molded tray. A heat sealing layer is on a first major side of a paperboard substrate. The heat sealing layer is sealed to the circumferential flange of the biofoam molded tray.

19 Claims, 2 Drawing Sheets

Related U.S. Application Data

(60) Provisional application No. 63/039,236, filed on Jun. 15, 2020.

(51) Int. Cl.

| | |
|---|---|
| *B32B 27/06* | (2006.01) |
| *B32B 27/10* | (2006.01) |
| *B32B 27/30* | (2006.01) |
| *B32B 27/32* | (2006.01) |
| *B32B 27/36* | (2006.01) |
| *B32B 29/00* | (2006.01) |
| *B32B 37/04* | (2006.01) |
| *B65D 65/46* | (2006.01) |

(52) U.S. Cl.
CPC .............. *B32B 27/32* (2013.01); *B32B 27/36* (2013.01); *B32B 29/007* (2013.01); *B32B 37/04* (2013.01); *B65D 65/466* (2013.01); *B32B 2266/02* (2013.01); *B32B 2305/022* (2013.01); *B32B 2307/31* (2013.01); *B32B 2307/4026* (2013.01); *B32B 2307/7163* (2013.01); *B32B 2307/732* (2013.01)

(58) Field of Classification Search
CPC .... B32B 2307/4026; B32B 2307/7163; B65D 65/40; B65D 65/42; B65D 65/46; B65D 65/466; B65D 53/06; B65D 77/20; B65D 77/2024; B65D 77/2032; B65D 81/133; B65D 81/34; B65D 81/3446
See application file for complete search history.

(56) References Cited

U.S. PATENT DOCUMENTS

| | | | |
|---|---|---|---|
| 2003/0091847 A1* | 5/2003 | Hawes | B32B 33/00 428/509 |
| 2008/0105587 A1 | 5/2008 | Hawes et al. | |
| 2011/0227254 A1* | 9/2011 | Reck-Glenn | B29C 43/003 264/328.17 |
| 2014/0335314 A1* | 11/2014 | Aldino | B32B 27/065 156/60 |
| 2014/0353198 A1* | 12/2014 | Bradfield | B65D 73/0092 206/470 |

* cited by examiner

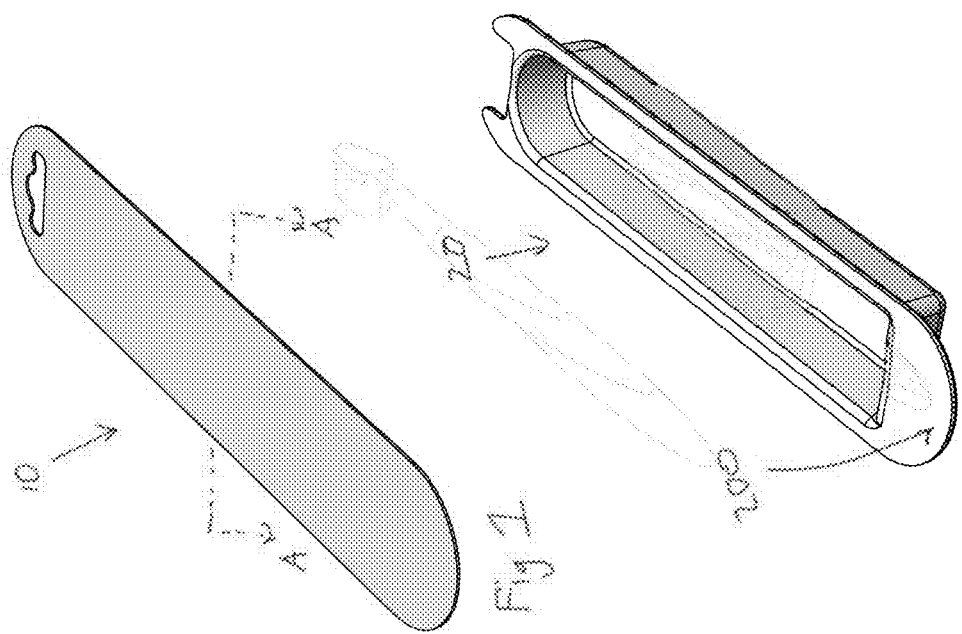
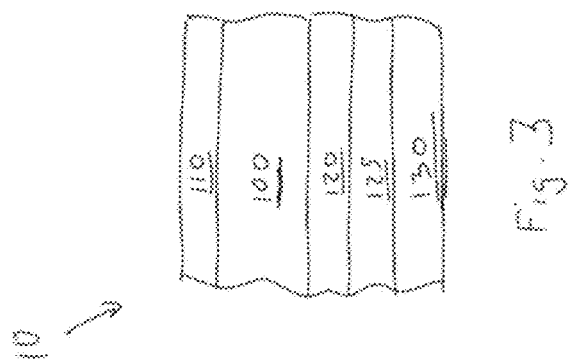

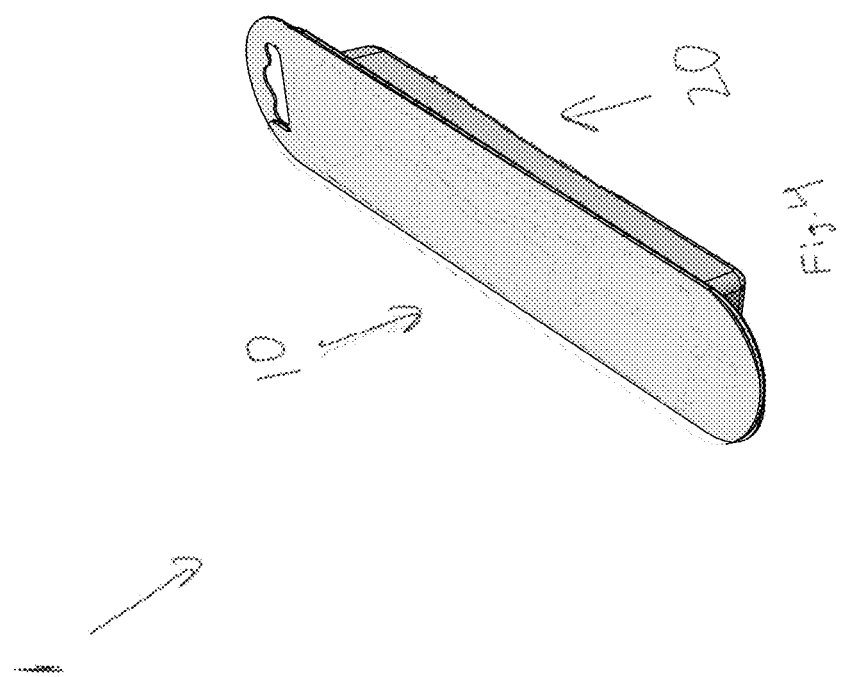

SUSTAINABLE SEALED PACKAGE AND METHOD FOR MANUFACTURING THEREOF

PRIORITY

This application claims priority from Intl. Pat. App. No. PCT/US2021/037476 filed on Jun. 15, 2021, which claims priority from U.S. Ser. No. 63/039,236 filed on Jun. 15, 2020. The entire contents of HERE and HERE are incorporated herein by reference.

FIELD

The present application relates to the field of sealed packages and methods for manufacturing, particularly blister packages for securely heat sealing products therein in a sustainable manner.

BACKGROUND

Manufacturers and retailers of consumer goods, such as pharmaceuticals, software, electronics, health and beauty products and the like, typically package their products in tamper resistant security packages. For example, many consumer goods are packaged in blister packages. Some conventional blister packages may comprise paperboard and a blister made from various polymeric materials.

Accordingly, those skilled in the art continue with research and development in the field of sustainable sealed package and method for manufacturing thereof.

SUMMARY

In one embodiment, a sustainable sealed package includes a biofoam molded tray and a paperboard structure. The biofoam molded tray includes a circumferential flange defining an opening to an interior cavity of the biofoam molded tray. A heat sealing layer is on a first major side of a paperboard substrate. The heat sealing layer of the paperboard structure is sealed to the circumferential flange of the biofoam molded tray.

In another embodiment, a method for manufacturing a sustainable sealed package includes contacting a heat sealing layer of a paperboard structure with a circumferential flange of a biofoam molded tray and heating the heat sealing layer.

Other embodiments of the disclosed sustainable sealed package and method for manufacturing thereof will become apparent from the following detailed description, the accompanying drawings and the appended claims.

BRIEF DESCRIPTION OF THE DRAWINGS

FIG. 1 is a perspective view of an exemplary paperboard structure of the present disclosure.

FIG. 2 is a perspective view of an exemplary biofoam molded tray of the present disclosure.

FIG. 3 is a cross section of the exemplary paperboard structure of FIG. 1 along section line A-A.

FIG. 4 is a perspective view of the paperboard structure of FIG. 1 sealed to the biofoam molded tray of FIG. 2.

DETAILED DESCRIPTION

Some conventional blister packages may comprise paperboard and a thermoformed plastic blister. The present disclosure provides a sustainable alternative to thermoformed plastic blister packages.

A sustainable sealed package of the present disclosure includes a biofoam molded tray including a circumferential flange defining an opening to an interior cavity of the biofoam molded tray; a paperboard substrate; and a heat sealing layer on a first major side of a paperboard substrate, wherein the heat sealing layer is sealed to the circumferential flange of the biofoam molded tray. Thus, sustainability of the package is provided by utilizing materials obtained from renewable resources, both the paperboard structure (comprised of the heat sealing layer on the paperboard substrate) and the biofoam molded tray sealed thereto.

The biofoam molded tray may be formed from a biopolymer based material, such as a starch-based material. The biopolymer based material may be formed from at least 50% by mass of biopolymer. The starch-based material may be formed from at least 50% by mass of starch. Additional ingredients can include fibers, such as cellulose fibers (e.g. wood fibers, sugar cane fibers, bamboo fibers, hemp fibers, etc.). In an example, the amount of fibers may be included in an amount of 0.5% by mass or more, such as between 2-25% by mass such as between 4-15% by mass.

The biofoam molded tray may have a blown foam structure. The blown foam structure may be formed by any suitable method. For example, a known method of forming a blown foam structure includes supplying a starch-based material comprising water as blowing agent under pressure into or through a mold and heating the starch-based material in a manner such as to give rise to gelatinization and cross-linking of the natural polymers. Due to heat activation of the blowing agent, the starch-based material creates foam, which solidifies to form the blow foam structure.

The paperboard substrate may be any suitable cellulosic substrate. For example, the paperboard substrate may be bleached or unbleached. The paperboard substrate may be, for example, a solid bleached sulfate (SBS) substrate, a uncoated natural kraft (UNC) substrate, or a coated natural kraft (CNK) substrate. The paperboard substrate may be formed from virgin fibers, recycled fibers, or combinations thereof.

The paperboard substrate may have any suitable thickness. In an example, paperboard substrate may have a caliper thickness in a range from about 10 point to about 30 point. In another example, the paperboard substrate has a caliper thickness in a range from about 10 point to about 20 point. In another example, the paperboard substrate has a caliper thickness in a range from about 15 point to about 25 point. In another example, the paperboard substrate has a caliper thickness in a range from about 20 point to about 30 point.

The paperboard structure may include a print layer on a second major side of the paperboard substrate. The print layer may provide the second major side of the paperboard substrate with a suitable surface for printing ink to the second major side to provide for advertising or aesthetic designs thereon. The print layer may be any suitable print layer. For example, the print layer may include clay, calcium carbonate, titanium dioxide, or combinations thereof.

The paperboard structure may include a tie layer between the paperboard substrate and the heat sealing layer. The tie layer may have excellent adhesive properties. In an example, the tie layer may be or include low density polyethylene.

The paperboard structure may include a tear resistant layer between the paperboard substrate and the heat sealing layer. The tear resistant layer may impart toughness to the paperboard structure. Any suitable tear resistant layer may be used. For example, the tear resistant layer may be or include polyethylene terephthalate. The tear resistant layer may be included in any suitable thickness. For example, the tear resistant layer may have a caliper thickness of about 0.75 mils or more, such as in a range from about 0.75 mils to about 5 mils.

The heat sealing layer may include any suitable material for heat sealing the paperboard structure to the biofoam molded tray. Preferably, the material for heat sealing the paperboard structure has a low heat sealing temperature such that heating of the heat sealing material does not damage the biofoam molded tray. In an example, the heat sealing layer may include ethylene vinyl acetate (EVA). In another example, the heat sealing layer may include ethylene methyl acrylate (EMA). In another example, the heat sealing layer may include ethylene vinyl acetate (EVA) and ethylene methyl acrylate (EMA).

In an aspect, the heat sealing layer is pre-provided on the paperboard structure. Thus, the paperboard structure having the heat sealing layer thereon can be manufactured, packaged, and transported to a facilitate the contents of the package will be loaded into the biofoam molded tray, and then the paperboard structure having the heat sealing layer thereon can be sealed to the biofoam molded tray.

The heat sealing layer may have any suitable coat weight or thickness sufficient for bonding the paperboard structure to the biofoam molded tray. In an aspect, due to the porous nature of the biofoam molded tray, the coat weight or thickness is relatively high to ensure bonding of the paperboard structure to the biofoam molded tray. A high thickness of the heat sealing layer allows the heat sealing layer to flow within the pores of the biofoam molded tray to increase a bonding surface area. In an aspect, the heat sealing layer has a coat weight of at least 5 pounds per 3,000 square feet. In another aspect, the heat sealing layer has a coat weight of at least 8 pounds per 3,000 square feet. In another aspect, the heat sealing layer has a coat weight of at least 12 pounds per 3,000 square feet. In an example, the heat sealing layer may have a coat weight of in a range of from 5 pounds per 3,000 square feet to 30 pounds per 3,000 square feet. In another example, the heat sealing layer may have a coat weight of in a range of from 8 pounds per 3,000 square feet to 30 pounds per 3,000 square feet. In yet another example, the heat sealing layer may have a coat weight of in a range of from 10 pounds per 3,000 square feet to 30 pounds per 3,000 square feet.

A method for manufacturing a sustainable sealed package includes contacting a heat sealing layer on a paperboard structure with a circumferential flange of a biofoam molded tray and heating the heat sealing layer. In an aspect, contacting the heat sealing layer to the circumferential flange includes applying pressure between the paperboard structure and the biofoam molded tray. To minimize deformation to the biofoam molded tray, applying pressure between the paperboard structure and the biofoam molded tray may include applying pressure directly to the circumferential flange. The heating of the heat sealing layer may occur in any manner by which the heat sealing layer can be heated, such as by infrared, microwave, or radio frequency (RF) heating, or by convection heating.

FIG. 1 is a perspective view of an exemplary paperboard structure of the present disclosure. FIG. 2 is a perspective view of an exemplary biofoam molded tray of the present disclosure. FIG. 3 is a cross section of the exemplary paperboard structure of FIG. 1 along section line A-A. FIG. 4 is a perspective view of the paperboard structure of FIG. 1 sealed to the biofoam molded tray of FIG. 2.

As shown in FIGS. 1 and 3, a paperboard structure 10 includes a heat sealing layer 130 on a first major side of a paperboard substrate 100. As shown, the paperboard structure 10 may further include an optional print layer 110 on a second major side of the paperboard substrate 100. The paperboard structure 10 may still further include an optional tie layer 120 and an optional tear resistant layer 125 between the paperboard substrate 100 and the heat sealing layer 130.

As shown in FIG. 2, the biofoam molded tray 20 includes a circumferential flange 200 defining an opening to an interior cavity of the biofoam molded tray.

FIG. 4 shows the resulting sustainable sealed package 1 of the present disclosure including the biofoam molded tray 20 sealed to the paperboard structure 10 by way of the heat sealing layer 130 on the first major side of a paperboard substrate 100. Prior to sealing the sustainable sealed package 1, contents, such as pharmaceuticals, software, electronics, health or beauty products, may be positioned in the interior cavity of the biofoam molded tray.

Although various embodiments of the disclosed sustainable sealed package and the method for manufacturing thereof have been shown and described, modifications may occur to those skilled in the art upon reading the specification. The present application includes such modifications and is limited only by the scope of the claims.

What is claimed is:

1. A sustainable sealed package, comprising:
   a biofoam molded tray comprising a circumferential flange defining an opening to an interior cavity of the biofoam molded tray, the biofoam molded tray comprising pores;
   a paperboard substrate; and
   a heat sealing layer on a first major side of the paperboard substrate, wherein the heat sealing layer has a coat weight in a range from about 5 pounds per 3,000 square feet to about 30 pounds per 3,000 square feet, wherein the heat sealing layer is sealed to the circumferential flange of the biofoam molded tray, and wherein at least a portion of the heat sealing layer is disposed within the pores of the biofoam molded tray.

2. The sustainable sealed package of claim 1 wherein the biofoam molded tray is formed from a biopolymer.

3. The sustainable sealed package of claim 1 wherein the biofoam molded tray is formed from a starch-based material.

4. The sustainable sealed package of claim 1 wherein the biofoam molded tray has a blown foam structure.

5. The sustainable sealed package of claim 1 wherein the paperboard substrate has a caliper thickness in a range from about 10 point to about 30 point.

6. The sustainable sealed package of claim 1 wherein the paperboard substrate has a caliper thickness in a range from about 15 point to about 25 point.

7. The sustainable sealed package of claim 1 further comprising a print layer on a second major side of the paperboard substrate.

8. The sustainable sealed package of claim 7 wherein the print layer comprises at least one of clay, calcium carbonate, and titanium dioxide.

9. The sustainable sealed package of claim 1 further comprising a tie layer between the paperboard substrate and the heat sealing layer.

10. The sustainable sealed package of claim 9 wherein the tie layer comprises low density polyethylene.

11. The sustainable sealed package of claim 1 further comprising a tear resistant layer between the paperboard substrate and the heat sealing layer.

12. The sustainable sealed package of claim 11 wherein the tear resistant layer comprises polyethylene terephthalate.

13. The sustainable sealed package of claim 11 wherein the tear resistant layer has a caliper thickness of about 0.75 mils or more.

14. The sustainable sealed package of claim 11 wherein the tear resistant layer has a caliper thickness in a range from about 0.75 mils to about 5 mils.

15. The sustainable sealed package of claim 1 wherein the heat sealing layer comprises ethylene vinyl acetate (EVA).

16. The sustainable sealed package of claim 1 wherein the heat sealing layer comprises ethylene methyl acrylate (EMA).

17. The sustainable sealed package of claim 1 wherein the heat sealing layer has a coat weight in a range from about 8 pounds per 3,000 square feet to about 30 pounds per 3,000 square feet.

18. The sustainable sealed package of claim 1 wherein the heat sealing layer has a coat weight in a range from about 10 pounds per 3,000 square feet to about 30 pounds per 3,000 square feet.

19. A method for manufacturing a sustainable sealed package, the method comprising:
contacting a heat sealing layer on a paperboard substrate with a circumferential flange of a biofoam molded tray, the heat sealing layer having a coat weight in a range from about 5 pounds per 3,000 square feet to about 30 pounds per 3,000 square feet, the biofoam molded tray comprising pores; and
heating the heat sealing layer to seal the paperboard substrate to the circumferential flange of the biofoam molded tray, wherein, when the paperboard substrate is sealed to the circumferential flange, at least a portion of the heat sealing layer is disposed within the pores of the biofoam molded tray.

* * * * *